United States Patent
Sivaraj et al.

(10) Patent No.: US 11,115,330 B2
(45) Date of Patent: Sep. 7, 2021

(54) ASSISTED REPLICATION WITH MULTI-HOMING AND LOCAL BIAS

(71) Applicant: Juniper Networks, Inc., Sunnyvale, CA (US)

(72) Inventors: Selvakumar Sivaraj, Sunnyvale, CA (US); Wen Lin, Andover, MA (US); Praful Lalchandani, Fremont, CA (US); Aldrin Isaac, San Jose, CA (US); Deepti J. Chandra, Sunnyvale, CA (US); Vishal Garg, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 250 days.

(21) Appl. No.: 15/957,345

(22) Filed: Apr. 19, 2018

(65) Prior Publication Data

US 2019/0288943 A1    Sep. 19, 2019

Related U.S. Application Data

(60) Provisional application No. 62/642,879, filed on Mar. 14, 2018.

(51) Int. Cl.
*H04L 12/741* (2013.01)
*H04L 12/46* (2006.01)
(Continued)

(52) U.S. Cl.
CPC .......... *H04L 45/74* (2013.01); *H04L 12/4641* (2013.01); *H04L 41/12* (2013.01);
(Continued)

(58) Field of Classification Search
None
See application file for complete search history.

(56) References Cited

U.S. PATENT DOCUMENTS 8,650,286 B1 * 2/2014 Sajassi .................. H04L 45/586
                                                                370/389
10,158,567 B1 * 12/2018 Zhang ..................... H04L 45/74
(Continued)

FOREIGN PATENT DOCUMENTS

CN         1551577 A    12/2004
CN       101606341 A    12/2009
(Continued)

OTHER PUBLICATIONS

Extended European Search Report for Application No. EP19160345.5, dated Aug. 7, 2019, 9 pages.
(Continued)

*Primary Examiner* — Gregory B Sefcheck
*Assistant Examiner* — Suk Jin Kang
(74) *Attorney, Agent, or Firm* — Harrity & Harrity, LLP

(57) ABSTRACT

A device may receive, from a provider edge device, a packet to be provided to one or more other provider edge devices. Some of the one or more other provider edge devices may be multi-homed with a same customer edge device as the provider edge device. The device may configure a source IP address of the packet based on a capability of an assisted replicator device after receiving the packet. The capability may relate to whether the assisted replicator device is capable of retaining the source IP address of the packet as received from the provider edge device. The device may provide the packet to at least some provider edge devices, of the one or more other provider edge devices, after configuring the source IP address of the packet.

20 Claims, 5 Drawing Sheets

(51) Int. Cl.
*H04L 12/24* (2006.01)
*H04L 29/12* (2006.01)
*H04L 29/08* (2006.01)
*H04L 12/721* (2013.01)
*H04L 12/761* (2013.01)
*H04L 12/707* (2013.01)
*H04L 12/723* (2013.01)
*H04L 12/18* (2006.01)

(52) U.S. Cl.
CPC .............. *H04L 45/16* (2013.01); *H04L 45/24* (2013.01); *H04L 45/50* (2013.01); *H04L 45/66* (2013.01); *H04L 61/2007* (2013.01); *H04L 67/1095* (2013.01); *H04L 12/18* (2013.01)

(56) References Cited

U.S. PATENT DOCUMENTS

| | | | | |
|---|---|---|---|---|
| 10,432,515 | B1* | 10/2019 | Sajassi | H04L 12/4645 |
| 2007/0133406 | A1* | 6/2007 | Vasseur | H04L 45/02 |
| | | | | 370/230 |
| 2008/0225888 | A1* | 9/2008 | Valluri | H04L 12/66 |
| | | | | 370/466 |
| 2010/0208741 | A1* | 8/2010 | Vasseur | H04L 45/02 |
| | | | | 370/400 |
| 2012/0110193 | A1* | 5/2012 | Zhou | H04L 12/14 |
| | | | | 709/227 |
| 2012/0213222 | A1* | 8/2012 | Filsfils | H04L 12/4641 |
| | | | | 370/390 |
| 2013/0227071 | A1* | 8/2013 | Valluri | H04L 12/66 |
| | | | | 709/217 |
| 2013/0297765 | A1 | 11/2013 | Zisapel et al. | |
| 2016/0021015 | A1* | 1/2016 | Thoria | H04L 47/2483 |
| | | | | 370/235 |
| 2016/0142220 | A1* | 5/2016 | Hao | H04L 12/18 |
| | | | | 370/390 |
| 2016/0219065 | A1* | 7/2016 | Dasgupta | H04L 63/1441 |
| 2017/0012937 | A1* | 1/2017 | Dinha | H04L 12/4641 |
| 2017/0310695 | A1* | 10/2017 | Vasseur | H04L 43/12 |
| 2017/0317919 | A1* | 11/2017 | Fernando | H04L 61/103 |
| 2018/0034665 | A1* | 2/2018 | Nguyen | H04L 12/4641 |
| 2018/0109436 | A1* | 4/2018 | Sajassi | H04L 45/74 |
| 2018/0109444 | A1* | 4/2018 | Sajassi | H04L 41/0893 |
| 2018/0139685 | A1* | 5/2018 | Wei | H04W 8/087 |
| 2018/0205652 | A1* | 7/2018 | Saxena | H04L 61/2557 |
| 2018/0287996 | A1* | 10/2018 | Tripathy | H04L 45/745 |
| 2018/0302242 | A1* | 10/2018 | Hao | H04L 12/4633 |
| 2018/0302321 | A1* | 10/2018 | Manthiramoorthy | |
| | | | | H04L 12/4633 |
| 2018/0322058 | A1* | 11/2018 | Tourrilhes | G06F 12/0815 |
| 2018/0341662 | A1* | 11/2018 | He | G06F 16/23 |
| 2018/0375763 | A1* | 12/2018 | Brissette | H04L 49/35 |
| 2019/0104063 | A1* | 4/2019 | Cidon | H04L 61/1511 |
| 2019/0109730 | A1* | 4/2019 | Uttaro | H04L 45/50 |
| 2019/0182286 | A1* | 6/2019 | Zini | H04L 61/256 |
| 2019/0319878 | A1* | 10/2019 | Sajassi | H04L 45/28 |
| 2020/0059381 | A1* | 2/2020 | Uttaro | H04L 12/4633 |
| 2020/0099775 | A1* | 3/2020 | Brissette | H04L 45/14 |

FOREIGN PATENT DOCUMENTS

| | | |
|---|---|---|
| CN | 103825834 A | 5/2014 |
| EP | 3148127 A1 | 3/2017 |

OTHER PUBLICATIONS

Rabadan et al., "Optimized Ingress Replication solution for EVPN draft-ietf-bess-evpn-optimized-ir-02", https://tools.ietf.org/html/draft-ietf-bess-evpn-optimized-ir-02, Aug. 16, 2017, 25 pages.

* cited by examiner

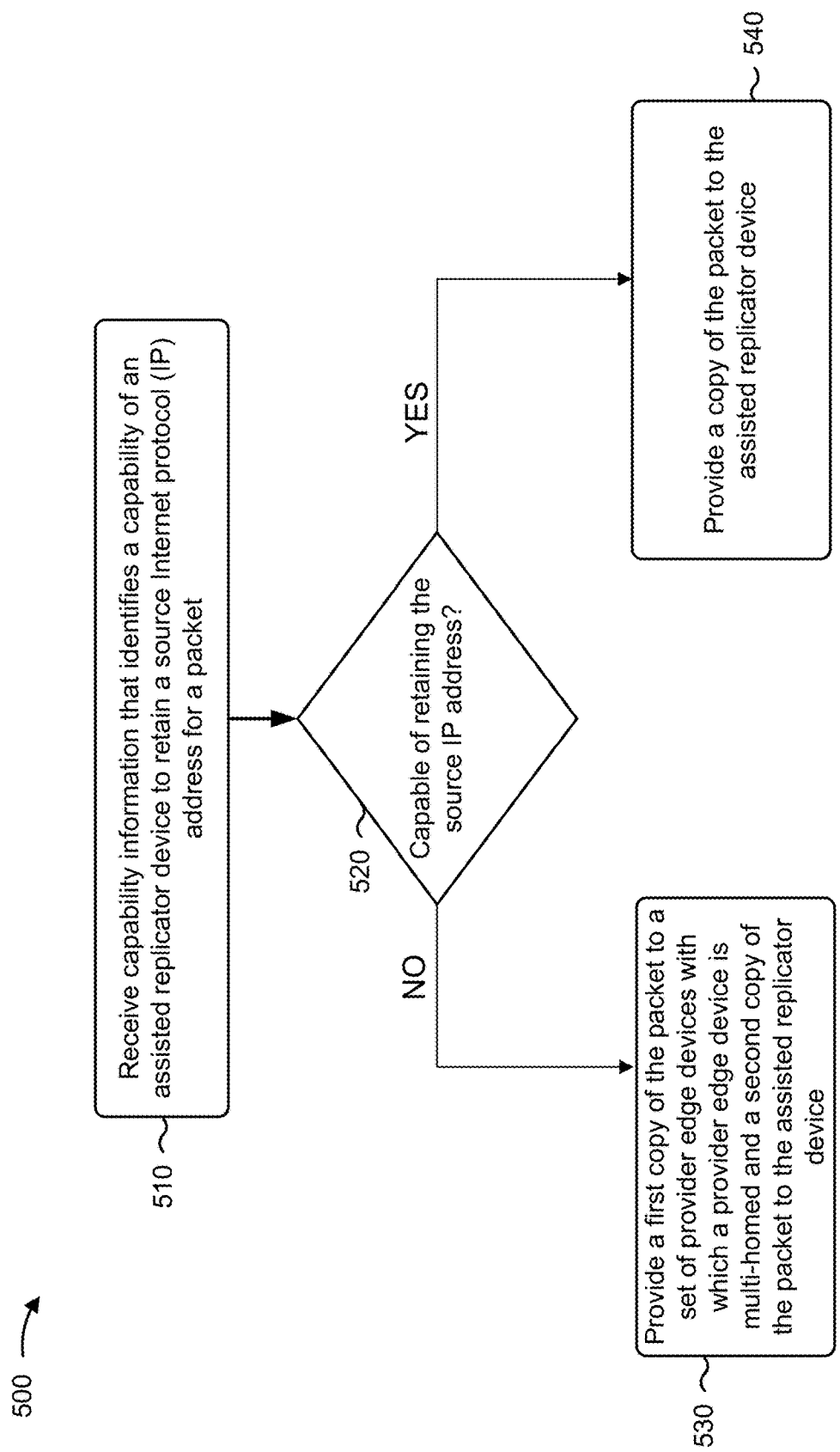

ASSISTED REPLICATION WITH MULTI-HOMING AND LOCAL BIAS

RELATED APPLICATION

This application claims priority under 35 U.S.C. § 119 to U.S. Provisional Patent Application No. 62/642,879, filed on Mar. 14, 2018, the content of which is incorporated by reference herein in its entirety.

BACKGROUND

Multi-homing can be useful for connecting a host or network to multiple networks in order to increase reliability, to improve performance, and/or to decease cost. Multi-homing is the practice of connecting a host or a network to more than one network or more than one device. Multi-homing may increase reliability by providing multiple links for packets (e.g., Internet protocol (IP) packets), so that if a link fails, the packets can be routed through other links. A multi-homed host may be assigned multiple addresses (e.g., IP addresses), such as one per connected network.

SUMMARY

According to some possible implementations, a method may include receiving, by an assisted replicator device and from a provider edge device, a packet to be provided to one or more other provider edge devices. The method may include configuring, by the assisted replicator device, an Internet protocol (IP) address of the assisted replicator device as a source IP address of the packet based on the assisted replicator device lacking a capability to retain the source IP address of the packet. The method may include providing, by the assisted replicator device, the packet to the one or more other provider edge devices after configuring the source IP address of the packet. The one or more other provider edge devices may not be multi-homed with a same customer edge device as the provider edge device.

According to some possible implementations, a device may include one or more memories; and one or more processors to receive, from a customer edge device, a packet to be provided to a set of provider edge devices. A first subset of the set of provider edge devices may be multi-homed with the customer edge device. A second subset of the set of provider edge devices may not be multi-homed with the customer edge device. The one or more processors may determine, after receiving the packet, a capability of an assisted replicator device based on capability information received from the assisted replicator device. The capability of the assisted replicator device may relate to whether the assisted replicator device is capable of retaining a source Internet protocol (IP) address of the packet. The one or more processors may provide a first copy of the packet to the first subset of the set of provider edge devices and a second copy of the packet to the assisted replicator device to permit the assisted replicator device to provide the second copy of the packet to the second subset of the set of provider edge devices.

According to some possible implementations, a non-transitory computer-readable medium may store one or more instructions that, when executed by one or more processors, cause the one or more processors to receive, from a provider edge device, a packet to be provided to one or more other provider edge devices. Some of the one or more other provider edge devices may be multi-homed with a same customer edge device as the provider edge device. The one or more instructions, when executed by the one or more processors, may cause the one or more processors to configure a source IP address of the packet based on a capability of an assisted replicator device after receiving the packet. The capability may relate to whether the assisted replicator device is capable of retaining the source IP address of the packet as received from the provider edge device. The one or more instructions, when executed by the one or more processors, may cause the one or more processors to provide the packet to at least some provider edge devices, of the one or more other provider edge devices, after configuring the source IP address of the packet.

BRIEF DESCRIPTION OF THE DRAWINGS

FIG. 5 is another flow chart of another example process for assisted replication with multi-homing and local bias.

DETAILED DESCRIPTION

The following detailed description of example implementations refers to the accompanying drawings. The same reference numbers in different drawings may identify the same or similar elements.

In a multi-homing context, when a packet is sent to a provider edge device, the packet may need to include a source Internet protocol (IP) address of another provider edge device via which the packet ingressed to a network for local biasing purposes (e.g., so that other provider edge devices do not provide the same packet to customer edge devices that are multi-homed to the provider edge device). Using assisted replication in the context of providing a packet from a provider edge device to multiple other provider edge devices may provide benefits related to reducing a quantity of copies of a packet sent from the provider edge device to the multiple provider edge devices (e.g., due to constraints on the quantity of copies of the packet the provider edge device can send). However, implementing assisted replication in a multi-homing context may be difficult or impossible due to devices (e.g., an assisted replicator device) and/or hardware resources (e.g., a processor, an application-specific integrated circuit (ASIC), etc.) related to implementing assisted replication lacking a capability to retain a source IP address in a packet when forwarding the packet from a provider edge device via which the packet was received (e.g., the source of the packet) to multiple other provider edge devices.

Some implementations, described herein provide a provider edge device and an assisted replicator device that are capable of dynamically implementing ingress replication and assisted replication in a multi-homing context. In this way, a source IP address of a packet may be retained for provider edge devices that need the source IP address despite an assisted replicator used to implement the assisted replication not being configured to retain a source IP address in a packet. This improves functioning of the assisted replicator device by facilitating use of the assisted replicator device in a multi-homing context where retention of a source IP address may be needed. In addition, this improves functioning of a provider edge device by facilitating simultaneous use of ingress replication and assisted replication by the provider edge device. Further, this conserves processing resources of a provider edge device implemented in a multi-homing context by reducing a quantity of copies of a packet the provider edge device has to send to provide the packet to multiple provider edge devices. Further, this conserves network resources (e.g., bandwidth) of connections associated with a provider edge device via which a packet ingressed by reducing a quantity of copies of the packet the provider edge device has to send to provide the packet to multiple other provider edge devices.

Figure 1:
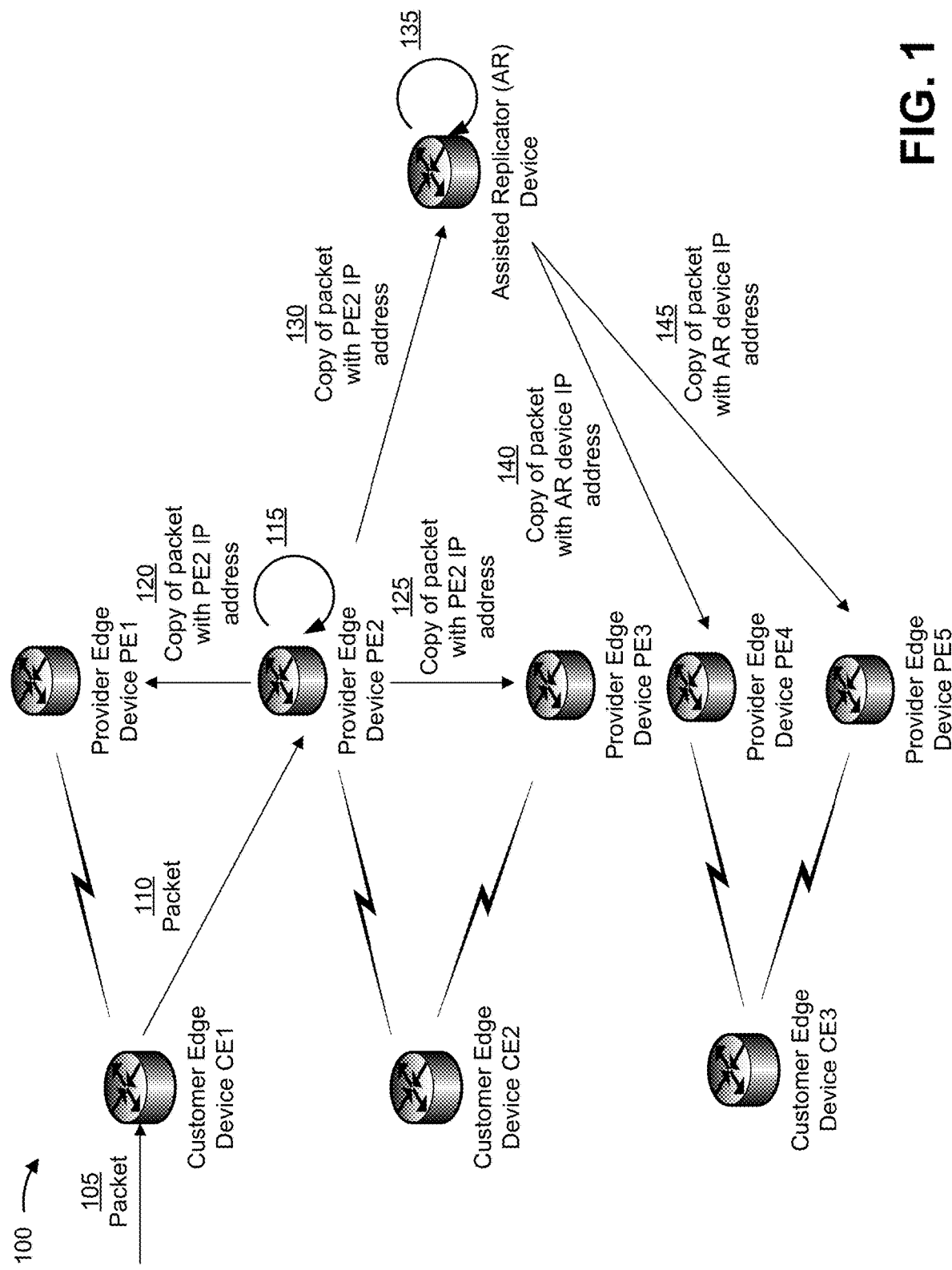
FIG. 1 is a diagram of an overview of an example implementation described herein.

FIG. 1 is a diagram of an overview of an example implementation 100 described herein. As shown in FIG. 1, implementation 100 includes multiple customer edge devices (e.g., shown as customer edge devices CE1 through CE3), multiple provider edge devices (e.g., shown as provider edge devices PE1 through PE5), and an assisted replicator (AR) device. For example, for implementation 100 assume that provider edge devices PE1 and PE2 are multi-homed with customer edge device CE1, that provider edge devices PE2 and PE3 are multi-homed with customer edge device CE2, and that provider edge devices PE4 and PE5 are multi-homed with customer edge device CE3.

As shown by reference number 105, customer edge device CE1 may receive a packet (e.g., from another device). For example, the packet may be associated with broadcast, unicast, multicast (BUM) traffic. While some implementations are described in the context of a single packet, in reality, the implementations apply to thousands, millions, or more packets being received by various customer edge devices, provider edge devices, and/or AR devices. Assume, for example, that the packet is destined for provider edge device PE2. As shown by reference number 110, customer edge device CE1 may provide the packet to provider edge device PE2 based on the packet being destined for provider edge device PE2 (e.g., based on information stored by customer edge device CE1 that identifies provider edge device PE2 as a next hop for the packet).

As shown by reference number 115, provider edge device PE2 may determine a capability of the AR device (e.g., using capability information that identifies a capability of the AR device). For example, the capability information may include a flag, an identifier, a set of bits, and/or the like configured in a provider multicast service interface (PMSI) tunnel attribute (PTA), a type-length-value (TLV) element, and/or the like associated with a type 3 route (e.g., an Ethernet virtual private network (EVPN) type 3 route used for BUM traffic forwarding, p-tunnel identification, etc.) advertised by the AR device. In some implementations, the capability information may indicate whether the AR device is configured to retain a source IP address when providing a packet to provider edge devices (e.g., the IP address of provider edge device PE2 when providing the packet to provider edge device PE1 or provider edge devices PE3 through PE5). For example, the source IP address may need to be retained in a multi-homed context so that provider edge devices can perform local biasing functions (e.g., identifying a source of a packet to eliminate duplicative receipt of the packet by the source of the packet).

In some implementations, if the AR device is capable of retaining a source IP address of a packet, provider edge device PE2 may determine to implement assisted replication and may provide the packet to the AR device so that the AR device can provide the packet to other provider edge devices. Conversely, if the AR device is not configured to retain a source IP address of a packet, provider edge device PE2 may determine to implement a combination of ingress replication (e.g., where provider edge device PE2 provides a copy of the packet to provider edge devices with which provider edge device PE2 is multi-homed for local biasing purposes) and assisted replication (e.g., where provider edge device PE2 provides another copy of the packet to the AR device so that the AR device can provide the other copy of the packet to other provider edge devices that are not multi-homed with provider edge device PE2). Assume for implementation 100 that the AR device is not configured to retain a source IP address of a packet when providing the packet. In this case, provider edge device PE2 may determine to use a combination of ingress replication and assisted replication.

As shown by reference number 120, provider edge device PE2 may provide a copy of the packet with provider edge device PE2's IP address configured as the source IP address of the packet to provider edge device PE1. Similarly, and as shown by reference number 125, provider edge device PE2 may provide a copy of the packet with provider edge device PE2's IP address configured as the source IP address of the packet to provider edge device PE3. In some implementations, provider edge device PE2 may provide the packet via customer edge devices CE1 and CE2 (e.g., customer edge devices via which provider edge devices PE1 through PE3 are multi-homed). In this way, provider edge device PE2 may implement ingress replication with regard to provider edge devices that are multi-homed with provider edge device PE2.

In some implementations, provider edge device PE2 may provide the packet to provider edge devices PE1 and PE3 based on provider edge devices PE1 and PE3 being multi-homed to the same customer edge devices as provider edge device PE2 (e.g., customer edge devices CE1 and CE2). In some implementations, provider edge device PE2 may provide the packet with provider edge device PE2's source IP address so that provider edge devices PE1 and PE3 can perform local biasing functions (e.g., duplicative providing of the packet to multi-homed provider edge devices). In this way, by providing copies of the packet to provider edge devices with which provider edge device PE2 is multi-homed (e.g., provider edge devices PE1 and PE3), provider edge device PE2 can implement ingress replication of the packet and can retain a source IP address (e.g., the IP address of provider edge device PE2) in copies of the packet provided to provider edge devices with which provider edge device PE2 is multi-homed.

As shown by reference number 130, in addition to providing a copy of the packet to provider edge devices PE1 and PE3, provider edge device PE2 may provide a copy of the packet with provider edge device PE2's IP address configured as the source IP address of the packet to the AR device (e.g., to implement assisted replication). For example, to implement assisted replication, the AR device may provide copies of the packet to provider edge devices that are not multi-homed with provider edge device PE2 (e.g., provider edge devices PE4 and PE5). By implementing assisted replication, provider edge device PE2 just needs to send a copy of the packet to other provider edge devices with which provider edge device PE2 is multi-homed and to the AR device, rather than sending a copy of the packet to all provider edge devices in a network (e.g., as would be the case if provider edge device PE2 implemented just ingress replication without using assisted replication). This conserves network resources (e.g., bandwidth) of connections associated with provider edge device PE2 and/or conserves processing resources of provider edge device PE2 by reducing or eliminating a quantity of copies of a packet that provider edge device PE2 sends to other devices.

As shown by reference number 135, the AR device may determine a set of provider edge devices to which to provide a copy of the packet (e.g., using information that identifies which provider edge devices are multi-homed to the same customer edge device(s)). For example, if the AR device is not capable of retaining the source IP address of the packet when providing the packet, the AR device may use type 1 routes (e.g., EVPN type 1 routes used for aliasing and/or Ethernet auto-discovery) exchanged among the devices of implementation 100, and the source IP address to identify provider edge devices multi-homed with the source of the packet (e.g., provider edge devices multi-homed with provider edge device PE2). Continuing with the previous example, the AR device may use type 1 routes from the devices of implementation 100, and the IP address of provider edge device PE2 to identify provider edge devices PE1 and PE3 as being multi-homed with provider edge device PE2. By identifying which provider edge devices are multi-homed to the source of the packet, the AR device my identify provider edge devices to which provider edge device PE2 would have provided a copy of the packet in association with implementing ingress replication (e.g., provider edge devices PE1 and PE3). In some implementations, the AR device may determine to provide the packet to provider edge devices which are not multi-homed with the source of the packet. For example, the AR device may identify provider edge devices PE4 and PE5 as provider edge devices to which to provide the packet (e.g., may determine to implement assisted replication with regard to provider edge devices PE4 and PE5). In other words, the AR device may use type 1 routes to identify provider edge devices that are not associated with either customer edge device CE1 or customer edge device CE2 (e.g., the customer edge devices with which provider edge device PE2 is multi-homed).

Conversely, if the AR device is capable of retaining a source IP address of a packet prior to providing the packet, the AR device may identify provider edge devices other than provider edge device PE2 as devices to receive the packet. For example, if provider edge device PE2 is just implementing assisted replication, rather than a combination of ingress replication and assisted replication, then provider edge device PE2 may have just provided a copy of the packet to the AR device rather than additionally providing a copy of the packet to provider edge devices PE1 and PE3.

In some implementations, if the AR device is not capable of retaining the source IP address of the packet (e.g., as would be the case when provider edge device PE2 is implementing a combination of ingress replication and assisted replication), the AR device may configure the packet with the IP address of the AR device as the source IP address of the packet. For example, the copy of the packet sent to provider edge devices not multi-homed with provider edge device PE2 (e.g., provider edge devices PE4 and PE5) may have the IP address of the AR device configured as the source IP address of the packet. Because provider edge devices PE4 and PE5 are not multi-homed with provider edge device PE2, provider edge devices PE4 and PE5 do not have a need to perform local biasing functions with regard to provider edge device PE2, and therefore do not need the packet to be configured with provider edge device PE2's IP address as the source IP address of the packet. In this way, the AR device can be used to implement assisted replication in a multi-homed context even if the AR device is not configured to retain a source IP address of a packet.

As shown by reference numbers 140 and 145, the AR device may provide a copy of the packet with the AR device's IP address configured as the source IP address of the packet to provider edge devices PE4 and PE5. In this way, assisted replication can be implemented by using the AR device to replicate and provide a copy of the packet to provider edge devices not multi-homed with provider edge device PE2. This facilitates implementation of assisted replication in a multi-homed context when the AR device used to implement the assisted replication is not configured to retain the source IP address of the packet when providing the packet. In some implementations, if the AR device is configured to retain the source IP address of the packet, the AR device may provide a copy of the packet to provider edge devices PE1 and PE3 through PE5 with provider edge device PE2's IP address as the source IP address of the packet.

In this way, an AR device, which is not configured to retain a source IP address of a packet, may be used in a multi-homed context via implementation of a combination of ingress replication and assisted replication. This conserves processing resources of a provider edge device via which the packet was received, by using the AR device to implement assisted replication. In addition, this reduces or eliminates duplicative receipt of a packet by the provider edge device via which the packet was received by facilitating retention of the source IP address of the provider edge device when providing the packet to other provider edge devices that are multi-homed with the provider edge device. In addition, this reduces or eliminates a need to reconfigure a network with an AR device that is capable of retaining a source IP address of a packet to implement assisted replication in a multi-homed context, thereby conserving costs associated with reconfiguring the network.

As indicated above, FIG. 1 is provided merely as an example. Other examples are possible and may differ from what was described with regard to FIG. 1.

The implementations described herein are equally applicable to EVPN with multiprotocol label switching (MPLS). For example, local biasing based on a source IP address may be used by a provider edge device that is using EVPN with virtual extensible local area network (VXLAN) to prevent duplicate packets from being sent to a multi-homed customer edge device, whereas with EVPN with MPLS, the provider edge device may use a split horizon label to prevent duplicate receipt of packets by a multi-homed customer edge device.

In this case, if a provider edge device is associated with a multi-homed Ethernet segment connecting the provider edge device to a customer edge device, the provider edge device may advertise a split horizon label for the multi-homed Ethernet segment. When a provider edge device receives a packet from the multi-homed Ethernet segment, the provider edge device may send the packet to a multi-homed peer provider edge device with the multi-homed Ethernet segment that was initially advertised. In this way, the multi-homed peer provider edge device can identify the origin of the packet so that the multi-homed peer provider edge device does not send the packet to a multi-homed customer edge device associated with the origin of the packet.

In some implementations, if the assisted replicator device is not capable of maintaining the split horizon label sent by the provider edge device while performing assisted replication of a packet, the assisted replicator device may advertise this information via a PTA flag associated with an EVPN type 3 route, in a manner similar to that described elsewhere herein. In some implementations, when the assisted replicator device is not capable of maintaining the split horizon label for a provider edge device, the provider edge device via which a packet ingresses may replicate the packet to provider edge devices with which the provider edge device is multi-homed and to the assisted replicator device, in a manner similar to that described elsewhere herein.

Figure 2:
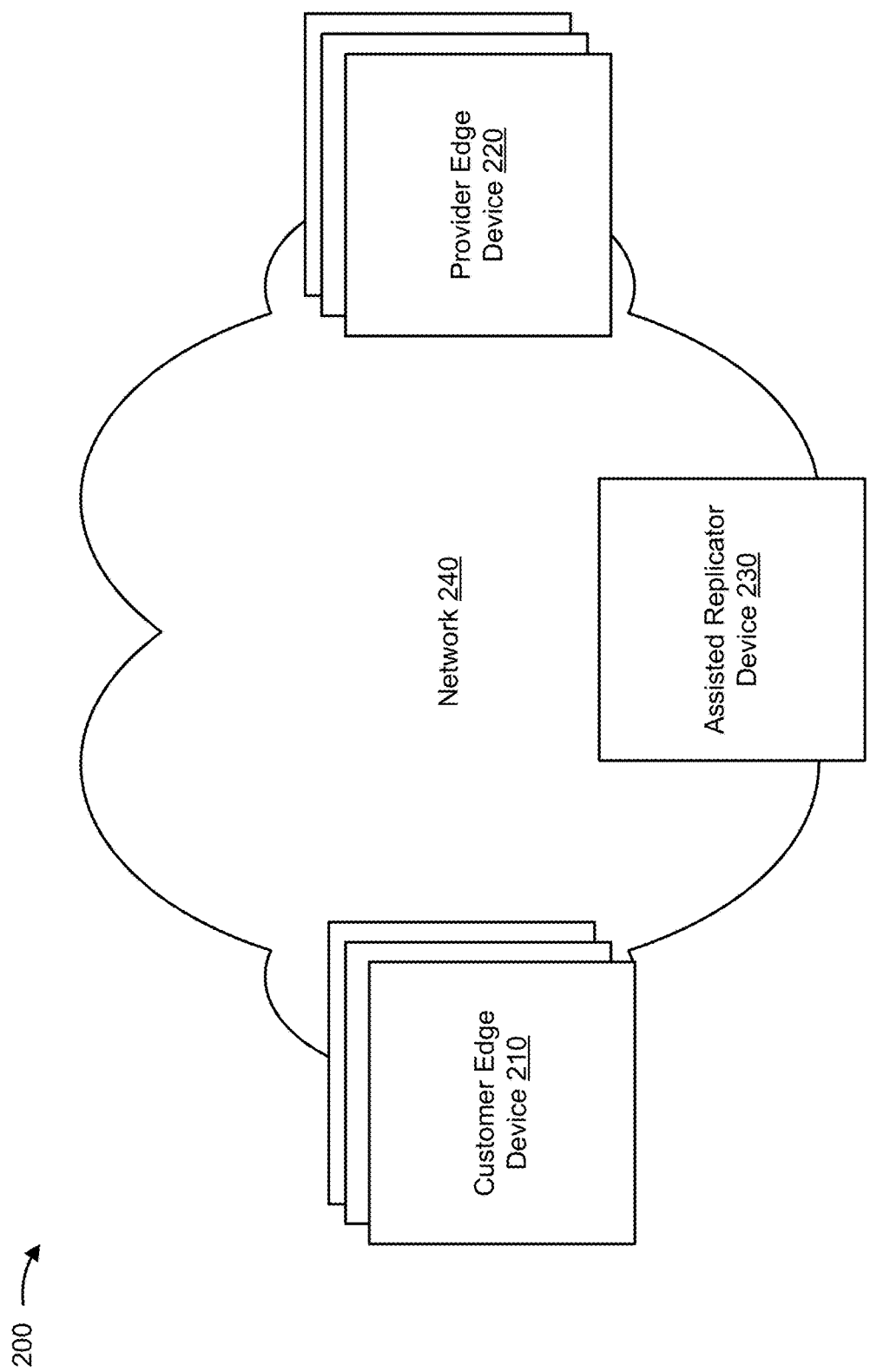
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of customer edge devices 210 (hereinafter referred to collectively as "customer edge devices 210," and individually as "customer edge device 210"), a set of provider edge devices 220 (hereinafter referred to collectively as "provider edge devices 220," and individually as "provider edge device 220"), an assisted replicator device 230, and a network 240. Devices of environment 200 may interconnect via wired connections, wireless connections, or a combination of wired and wireless connections.

Customer edge device 210 includes one or more devices (e.g., one or more traffic transfer devices) capable of processing and/or transferring traffic. For example, customer edge device 210 may include a firewall, a router, a gateway, a switch, a hub, a bridge, a reverse proxy, a server (e.g., a proxy server), a security device, an intrusion detection device, a load balancer, or a similar type of device. In some implementations, customer edge device 210 may transmit traffic to provider edge device 220, as described elsewhere herein. In some implementations, customer edge device 210 may be a physical device implemented within a housing, such as a chassis. In some implementations, customer edge device 210 may be a virtual device implemented by one or more computer devices of a cloud computing environment or a data center.

Provider edge device 220 includes one or more devices (e.g., one or more traffic transfer devices) capable of processing and/or transferring traffic. For example, provider edge device 220 may include a firewall, a router, a gateway, a switch, a hub, a bridge, a reverse proxy, a server (e.g., a proxy server), a security device, an intrusion detection device, a load balancer, or a similar type of device. In some implementations, provider edge device 220 may receive traffic from customer edge device 210 and may provide the traffic to another provider edge device 220 and/or to assisted replicator device 230, as described elsewhere herein. In some implementations, provider edge device 220 may be configured to implement assisted replication or a combination of ingress replication and assisted replication, as described elsewhere herein. In some implementations, provider edge device 220 may be a physical device implemented within a housing, such as a chassis. In some implementations, provider edge device 220 may be a virtual device implemented by one or more computer devices of a cloud computing environment or a data center.

Assisted replicator device 230 includes one or more devices (e.g., one or more traffic transfer devices) capable of processing and/or transferring traffic. For example, assisted replicator device 230 may include a firewall, a router, a gateway, a switch, a hub, a bridge, a reverse proxy, a server (e.g., a proxy server), a security device, an intrusion detection device, a load balancer, or a similar type of device. In some implementations, assisted replicator device 230 may receive a packet from provider edge device 220 and may provide a copy of the packet to one or more other provider edge devices, as described elsewhere herein. In some implementations, assisted replicator device 230 may be a physical device implemented within a housing, such as a chassis. In some implementations, assisted replicator device 230 may be a virtual device implemented by one or more computer devices of a cloud computing environment or a data center.

Network 240 includes one or more wired and/or wireless networks. For example, network 240 may include a cellular network (e.g., a long-term evolution (LTE) network, a 3G network, or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
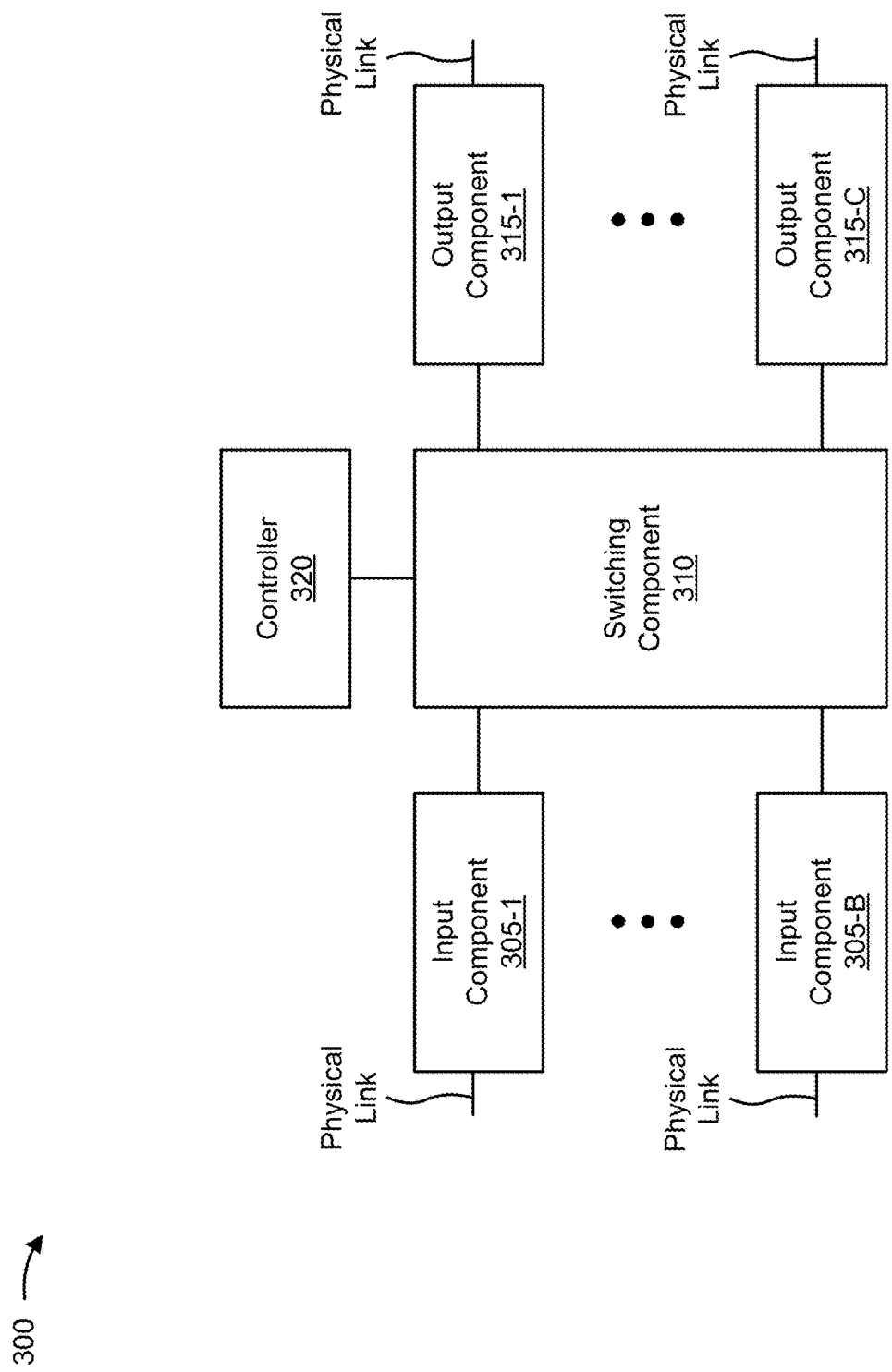
FIG. 3 is a diagram of example components of one or more devices of FIG. 2.

FIG. 3 is a diagram of example components of a device 300. Device 300 may correspond to customer edge device 210, provider edge device 220, and/or assisted replicator device 230. In some implementations, customer edge device 210, provider edge device 220, and/or assisted replicator device 230 may include one or more devices 300 and/or one or more components of device 300. As shown in FIG. 3, device 300 may include one or more input components 305-1 through 305-B (B≥1) (hereinafter referred to collectively as "input components 305," and individually as "input component 305"), a switching component 310, one or more output components 315-1 through 315-C (C≥1) (hereinafter referred to collectively as "output components 315," and individually as "output component 315"), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., an input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes based on executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
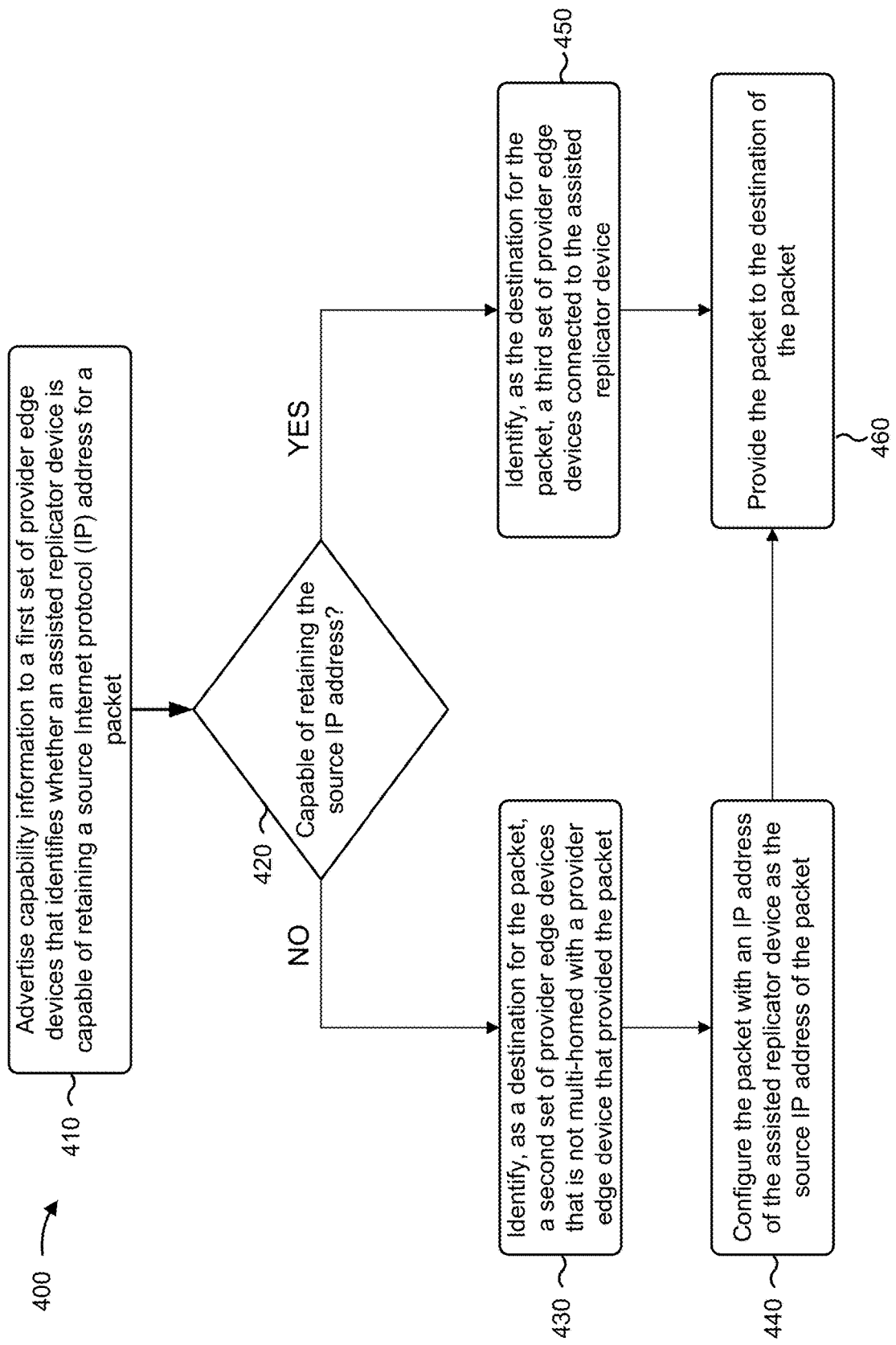
FIG. 4 is a flow chart of an example process for assisted replication with multi-homing and local bias.

FIG. 4 is a flow chart of an example process 400 for assisted replication with multi-homing and local bias. In some implementations, one or more process blocks of FIG. 4 may be performed by assisted replicator device 230. In some implementations, one or more process blocks of FIG. 4 may be performed by another device or a group of devices separate from or including assisted replicator device 230, such as customer edge device 210 or provider edge device 220.

As shown in FIG. 4, process 400 may include advertising capability information to a first set of provider edge devices that identifies whether an assisted replicator device is capable of retaining a source Internet protocol (IP) address for a packet (block 410). For example, assisted replicator device 230 (e.g., using controller 320, output component 315, etc.) may advertise capability information to a first set of provider edge devices 220 that identifies whether an assisted replicator device is capable of retaining a source Internet protocol (IP) address for a packet (e.g., the first set of provider edge devices 220 may include provider edge devices 220 with which assisted replicator device 230 is connected). In some implementations, assisted replicator device 230 may advertise capability information in a manner that is the same as or similar to that described with regard to FIG. 1. For example, assisted replicator device 230 may advertise the capability information in association with an Ethernet virtual private network (EVPN) type 3 route.

As further shown in FIG. 4, process 400 may include determining whether the assisted replicator device is capable of retaining the source IP address of the packet (block 420). For example, assisted replicator device 230 (e.g., using controller 320) may determine whether assisted replicator device 230 is capable of retaining the source IP address of the packet (e.g., after receiving the packet from a particular provider edge device 220). In some implementations, assisted replicator device 230 may determine whether assisted replicator device 230 is capable of retaining the source IP address in a manner that is the same as or similar to that described with regard to FIG. 1. For example, assisted replicator device 230 may be configured to retain the source IP address of the packet. Conversely, and as another example, assisted replicator device 230 may not be configured to retain the source IP address of the packet.

As further shown in FIG. 4, if the assisted replicator device is not capable of retaining the source IP address (block 420-NO), then process 400 may include identifying, as a destination for the packet, a second set of provider edge devices that is not multi-homed with a provider edge device that provided the packet (block 430). For example, assisted replicator device 230 (e.g., using controller 320) may identify, as a destination for the packet, a second set of provider edge devices 220 that is not multi-homed with a particular provider edge device 220 that provided the packet. In some implementations, assisted replicator device 230 may identify a set of provider edge devices 220 that are not multi-homed to a particular provider edge device 220 that provided the packet as the second set of provider edge devices 220 in a manner that is the same as or similar to that described with regard to FIG. 1. For example, assisted replicator device 230 may identify the set of provider edge devices 220 based on a set of EVPN type 1 routes from provider edge devices 220.

As further shown in FIG. 4, process 400 may include configuring the packet with an IP address of the assisted replicator device as the source IP address of the packet (block 440). For example, assisted replicator device 230 (e.g., using controller 320) may configure the packet with an IP address of assisted replicator device 230 as the source IP address of the packet (e.g., based on assisted replicator device 230 lacking a capability to retain the source IP address of the packet). In some implementations, assisted replicator device 230 may configure the packet with an IP address in a manner that is the same as or similar to that described with regard to FIG. 1. For example, assisted replicator device 230 may configure the packet with the IP address of assisted replicator device 230 rather than the IP address of a particular provider edge device 220 that provided the packet to assisted replicator device 230.

As further shown in FIG. 4, if the assisted replicator device is capable of retaining the source IP address (block 420-YES), then process 400 may include identifying, as the destination for the packet, a third set of provider edge devices connected to the assisted replicator device (block 450). For example, assisted replicator device 230 (e.g., using controller 320) may identify, as the destination for the packet, a third set of provider edge devices 220 connected to assisted replicator device 230 (e.g., regardless of whether provider edge devices 220 are multi-homed to a particular provider edge device 220 that provided the packet to assisted replicator device 230). In some implementations, assisted replicator device 230 may identify a set of provider edge devices 220 connected to assisted replicator device 230 as the third set of provider edge devices 220 in a manner that is the same as or similar to that described with regard to FIG. 1. For example, assisted replicator device 230 may identify provider edge devices 220 that are multi-homed with a particular customer edge device 210 or that are not multi-homed to the particular customer edge device 210 as the third set of provider edge devices 220.

As further shown in FIG. 4, process 400 may include providing the packet to the destination of the packet (block 460). For example, assisted replicator device 230 (e.g., using controller 320, output component 315, switching component 310, etc.) may provide the packet to the destination of the packet. In some implementations, assisted replicator device 230 may provide the packet to the destination of the packet in a manner that is the same as or similar to that described with regard to FIG. 1. For example, assisted replicator device 230 may provide the packet to the second set provider edge devices 220 (e.g., a set that does not include provider edge devices 220 that are multi-homed to a particular customer edge device 210) or to the third set of provider edge devices 220 (e.g., a set that includes provider edge devices 220 that are multi-homed to the particular provider edge device 220 and/or that are not multi-homed to the particular provider edge device 220).

Process 400 may include additional implementations, such as any single implementation or any combination of implementations described below or described below with regard to process 500 of FIG. 5.

In some implementations, assisted replicator device 230 may advertise capability information that identifies the capability of assisted replicator device 230 to provider edge device 220 prior to receiving the packet, and may receive the packet after advertising the capability information to provider edge device 220. In some implementations, the capability information may be included in an EVPN type 3 route. In some implementations, assisted replicator device 230 may configure a flag in a provider multicast service interface (PMSI) tunnel attribute (PTA) of an EVPN type 3 route (e.g., where the flag indicates the capability of assisted replicator device 230), and may advertise the EVPN type 3 route to provider edge device 220 prior to receiving the packet and after configuring the flag.

In some implementations, assisted replicator device 230 may identify the second set of provider edge devices 220 to which to provide the packet based on multi-homed information that identifies a set of provider edge devices 220 that is multi-homed with a same customer edge device 210 as a particular provider edge device 220 (e.g., that provided the packet to assisted replicator device 230) after receiving the packet, and may provide the packet to the second set of provider edge devices 220 after identifying the second set of provider edge devices 220. In some implementations, the multi-homed information may be included in an EVPN type 1 route received from the particular provider edge device 220 or the second set of provider edge devices 220.

In some implementations, assisted replicator device 230 may determine that assisted replicator device 230 is not capable of retaining the source IP address of the packet as received from a particular provider edge device 220 (e.g., that provided the packet), and may configure the source IP address of the packet as an IP address of assisted replicator device 230 after determining that assisted replicator device 230 is not capable of retaining the source IP address of the packet as received from the particular provider edge device 220. In some implementations, assisted replicator device 230 may provide the packet to the second set of provider edge devices 220 after configuring the source IP address of the packet (e.g., where the second set of provider edge devices 220 is not multi-homed with the same customer edge device 210 as a particular provider edge device 220 that provided the packet to assisted replicator device 230).

In some implementations, assisted replicator device 230 may determine that assisted replicator device 230 is capable of retaining the source IP address of the packet as received by assisted replicator device 230, and may configure the source IP address of the packet as an IP address of a particular provider edge device 220 (e.g., that provided the packet to assisted replicator device 230) after determining that assisted replicator device 230 is capable of retaining the source IP address of the packet. In some implementations, assisted replicator device 230 may provide the packet to the third set of provider edge devices 220 after configuring the source IP address of the packet (e.g., where the third set of provider edge devices 220 includes provider edge devices 220 that are not multi-homed with the same customer edge device 210 as a particular provider edge device 220 that provided the packet, or that are multi-homed with the same customer edge device 210 as the particular provider edge device 220).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for assisted replication with multi-homing and local bias. In some implementations, one or more process blocks of FIG. 5 may be performed by provider edge device 220. In some implementations, one or more process blocks of FIG. 5 may be performed by another device or a group of devices separate from or including provider edge device 220, such as customer edge device 210 or assisted replicator device 230.

As shown in FIG. 5, process 500 may include receiving capability information that identifies a capability of an assisted replicator device to retain a source Internet protocol (IP) address for a packet (block 510). For example, provider edge device 220 (e.g., using controller 320, input component 305, etc.) may receive capability information that identifies a capability of assisted replicator device 230 to retain a source Internet protocol (IP) address for a packet (e.g., where the capability relates to whether assisted replicator device 230 is capable of retaining a source IP address of the packet). In some implementations, provider edge device 220 may receive capability information in a manner that is the same as or similar to that described with regard to FIG. 1. For example, provider edge device 220 may receive capability information included in an EVPN type 3 route received from assisted replicator device 230.

As further shown in FIG. 5, process 500 may include determining whether the assisted replicator device is capable of retaining the source IP address (block 520). For example, provider edge device 220 (e.g., using controller 320) may determine whether assisted replicator device 230 is capable of retaining the source IP address. In some implementations, provider edge device 220 may determine whether assisted replicator device 230 is capable of retaining the source IP address in a manner that is the same as or similar to that described with regard to FIG. 1. For example, provider edge device 220 may determine whether assisted replicator device 230 is capable of retaining the source IP address based on the capability information.

As further shown in FIG. 5, if the provider edge device determines that the assisted replicator device is not capable of retaining the source IP address (block 520-NO), then process 500 may include providing a first copy of the packet to a set of provider edge devices with which a provider edge device is multi-homed and a second copy of the packet to the assisted replicator device (block 530). For example, provider edge device 220 (e.g., using controller 320, output component 315, switching component 310, etc.) may provide a first copy of the packet to a set of provider edge devices 220 with which provider edge device 220 (e.g., that received the capability information) is multi-homed and a second copy of the packet to assisted replicator device 230 (e.g., where the second copy of the packet permits assisted replicator device 230 to provide the second copy of the packet to the second set of provider edge devices 220). In some implementations, provider edge device 220 may provide the first copy of the packet and the second copy of the packet in a manner that is the same as or similar to that described with regard to FIG. 1. For example, provider edge device 220 may provide the first copy of the packet to the set of provider edge devices 220 and the second copy of the packet to assisted replicator device 230.

As further shown in FIG. 5, if the provider edge device determines that the assisted replicator device is capable of retaining the source IP address (block 520-YES), then process 500 may include providing a copy of the packet to the assisted replicator device (block 540). For example, provider edge device 220 (e.g., using controller 320, output component 315, switching component 310, etc.) may provide a copy of the packet to assisted replicator device 230. In some implementations, provider edge device 220 may provide a copy of the packet in a manner that is the same as or similar to that described with regard to FIG. 1. For example, provider edge device 220 may provide a copy of the packet to assisted replicator device 230 without providing other copies of the packet to provider edge devices 220.

Process 500 may include additional implementations, such as any single implementation or any combination of implementations described below or described above with regard to process 400 of FIG. 4.

In some implementations, provider edge device 220 may receive the capability information from assisted replicator device 230 prior to receiving the packet (e.g., where the capability information is included in an EVPN type 3 route advertised by assisted replicator device 230). In some implementations, the capability information may include a flag of a PMSI tunnel attribute (PTA) associated with the EVPN type 3 route. In some implementations, provider edge device 220 may process the capability information to identify a capability of assisted replicator device 230 (e.g., where an identifier included in the capability information identifies the capability of assisted replicator device 230), and may determine the capability of assisted replicator device 230 after processing the capability information to identify the identifier.

In some implementations, provider edge device 220 may determine that assisted replicator device 230 is not capable of retaining the source IP address of the packet, and may provide the first copy of the packet and the second copy of the packet based on determining that assisted replicator device 230 is not capable of retaining the source IP address. In some implementations, provider edge device 220 may receive, from customer edge device 210, another packet to be provided to another set of provider edge devices 220, and may determine, after receiving the other packet, that another assisted replicator device 230 is capable of retaining the source IP address of the other packet based on other capability information from the other assisted replicator device 230. In some implementations, provider edge device 220 may provide the other packet to the other assisted replicator device 230 without providing the packet to the other set of provider edge devices 220 (e.g., where at least one provider edge device 220, of the other set of provider edge devices 220, is multi-homed with a particular provider edge device 220).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, provider edge devices 220 that are multi-homed to a particular provider edge device 220 may receive a packet that is configured with an IP address of the particular edge device 220 as the source IP address of the packet while utilizing assisted replication. This conserves processing resources of the particular provider edge device 220 via use of assisted replication without impeding use of multi-homing. In addition, this improves a capability of assisted replicator device 230 to be deployed in a multi-homed context despite assisted replicator device 230 not being configured to retain a source IP address for the packet. Further, this reduces a quantity of copies of a packet that provider edge device 220 has to provide, thereby conserving processing resources of provider edge device 220.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

As used herein, the term "or" is meant to mean (or be the equivalent of) "and/or," unless otherwise stated (e.g., when "or" is used in combination with "either"). In other words, as used herein, the term "or" is an inclusive "or," unless explicitly stated otherwise (e.g., when "or" is used in combination with "either").

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by an assisted replicator device and from a provider edge device, a packet to be provided to one or more other provider edge devices;
   configuring, by the assisted replicator device, a flag in a provider multicast service interface (PMSI) tunnel attribute of an Ethernet virtual private network (EVPN) type 3 route,
      wherein the flag indicates a capability of the assisted replicator device;
   configuring, by the assisted replicator device, an Internet protocol (IP) address of the assisted replicator device as a source IP address of the packet based on the flag in the PMSI tunnel attribute indicating the assisted replicator device is not configured to retain the source IP address of the packet; and
   providing, by the assisted replicator device, the packet to the one or more other provider edge devices after configuring the source IP address of the packet,
      wherein the one or more other provider edge devices are not multi-homed with a same customer edge device as the provider edge device.

2. The method of claim 1, further comprising:
   advertising capability information, that identifies the capability of the assisted replicator device, to the provider edge device prior to receiving the packet; and
   wherein receiving the packet comprises:
      receiving the packet after advertising the capability information to the provider edge device.

3. The method of claim 1, further comprising:
   identifying the one or more other provider edge devices to which to provide the packet based on multi-homed information that identifies a set of provider edge devices that is multi-homed with the same customer edge device as the provider edge device after receiving the packet; and
   wherein providing the packet comprises:
      providing the packet to the one or more other provider edge devices after identifying the one or more other provider edge devices.

4. The method of claim 3, wherein the multi-homed information is included in an Ethernet virtual private network (EVPN) type 1 route received from the provider edge device or the one or more other provider edge devices.

5. The method of claim 1, wherein the packet is a copy of another packet that the provider edge device provided to a set of provider edge devices that is multi-homed with the same customer edge device as the provider edge device.

6. The method of claim 1, further comprising:
   advertising the EVPN type 3 route to the provider edge device prior to receiving the packet and after configuring the flag.

7. The method of claim 1, wherein the assisted replicator device is an application-specific integrated circuit (ASIC).

8. A device, comprising:
   one or more memories; and
   one or more processors to:
      receive, from a customer edge device, a packet to be provided to a set of provider edge devices,
         wherein a first subset of the set of provider edge devices is multi-homed with the customer edge device,
         wherein a second subset of the set of provider edge devices is not multi-homed with the customer edge device;
      configure a flag in a provider multicast service interface (PMSI) tunnel attribute of an Ethernet virtual private network (EVPN) type 3 route,
         wherein the flag indicates capability information indicating a capability of an assisted replicator device;
      determine, after receiving the packet, the capability of the assisted replicator device based on the capability information received from the assisted replicator device,
         wherein the capability of the assisted replicator device relates to whether the assisted replicator device is capable of retaining a source Internet protocol (IP) address of the packet, and
         wherein the assisted replicator device is not configured to retain the source IP address of the packet; and
      provide a first copy of the packet to the first subset of the set of provider edge devices and a second copy of the packet to the assisted replicator device to permit the assisted replicator device to provide the second copy of the packet to the second subset of the set of provider edge devices.

9. The device of claim 8, wherein the one or more processors are further to:
   receive the capability information from the assisted replicator device prior to receiving the packet,
      wherein the capability information is included in the EVPN type 3 route advertised by the assisted replicator device.

10. The device of claim 8, wherein the one or more processors are further to:
   process the capability information to identify the capability of the assisted replicator device;
   and
   wherein the one or more processors, when determining the capability of the assisted replicator device, are to:
      determine the capability of the assisted replicator device after processing the capability information.

11. The device of claim 8, wherein the one or more processors, when determining the capability of the assisted replicator device, are to:
   determine that the assisted replicator device is not capable of retaining the source IP address of the packet; and
   wherein the one or more processors, when providing the first copy of the packet and the second copy of the packet, are to:
      provide the first copy of the packet and the second copy of the packet based on determining that the assisted replicator device is not capable of retaining the source IP address.

12. The device of claim 8, wherein the one or more processors are further to:
   receive, from the customer edge device, another packet to be provided to another set of provider edge devices; and
   determine, after receiving the other packet, that another assisted replicator device is capable of retaining the source IP address of the other packet based on other capability information from the other assisted replicator device.

13. The device of claim 12, wherein the one or more processors are further to:
   provide the other packet to the other assisted replicator device without providing the packet to the other set of provider edge devices,
      wherein at least one provider edge device, of the other set of provider edge devices, is multi-homed with the provider edge device.

14. The device of claim 8, wherein the assisted replicator device is an application-specific integrated circuit (ASIC).

15. A non-transitory computer-readable medium storing instructions, the instructions comprising:
   one or more instructions that, when executed by one or more processors, cause the one or more processors to:
      receive, from a provider edge device, a packet to be provided to one or more other provider edge devices,
         wherein some of the one or more other provider edge devices are not multi-homed with a same customer edge device as the provider edge device;
      configure a flag in a provider multicast service interface (PMSI) tunnel attribute of an Ethernet virtual private network (EVPN) type 3 route,
         wherein the flag indicates a capability of an assisted replicator device;
      configure a source Internet protocol (IP) address of the packet based on the flag in the PMSI tunnel attribute indicating the capability of the assisted replicator device after receiving the packet,
         wherein the capability relates to whether the assisted replicator device is capable of retaining the source IP address of the packet as received from the provider edge device, and
         wherein the assisted replicator device is not configured to retain the source IP address of the packet; and
      provide the packet to at least some provider edge devices that are not multi-homed with the same customer edge device, of the one or more other provider edge devices, after configuring the source IP address of the packet.

16. The non-transitory computer-readable medium of claim 15, wherein the one or more instructions, when executed by the one or more processors, further cause the one or more processors to:
   determine that the assisted replicator device is not capable of retaining the source IP address of the packet as received from the provider edge device; and
   wherein configuring the source IP address of the packet comprises:
      configuring the source IP address of the packet as an IP address of the assisted replicator device after determining that the assisted replicator device is not capable of retaining the source IP address of the packet as received from the provider edge device.

17. The non-transitory computer-readable medium of claim 15, wherein the one or more instructions, when executed by the one or more processors, further cause the one or more processors to:
   determine that the assisted replicator device is capable of retaining the source IP address of the packet as received by the assisted replicator device; and
   wherein the one or more instructions, that cause the one or more processors to configure the source IP address of the packet, cause the one or more processors to:
      configure the source IP address of the packet as an IP address of the provider edge device after determining that the assisted replicator device is capable of retaining the source IP address of the packet.

18. The non-transitory computer-readable medium of claim 17, wherein the one or more instructions, that cause the one or more processors to provide the packet to the at least some provider edge devices, cause the one or more processors to:
   provide the packet to the at least some provider edge devices, of the one or more other provider edge devices, after configuring the source IP address of the packet,
      wherein the at least some provider edge devices includes provider edge devices that are not multi-homed with the same customer edge device as the provider edge device, or that are multi-homed with the same customer edge device as the provider edge device.

19. The non-transitory computer-readable medium of claim 15, wherein the one or more instructions, when executed by the one or more processors, further cause the one or more processors to:
   provide capability information to the provider edge device prior to receiving the packet,
      wherein the capability information identifies the capability of the assisted replicator device,
      wherein the capability information is included in the EVPN type 3 route associated with the assisted replicator device.

20. The non-transitory computer-readable medium of claim 15, wherein some of the one or more other provider edge devices are multi-homed with the same customer edge device using a multi-homed Ethernet segment.

\* \* \* \* \*